UNITED STATES PATENT OFFICE.

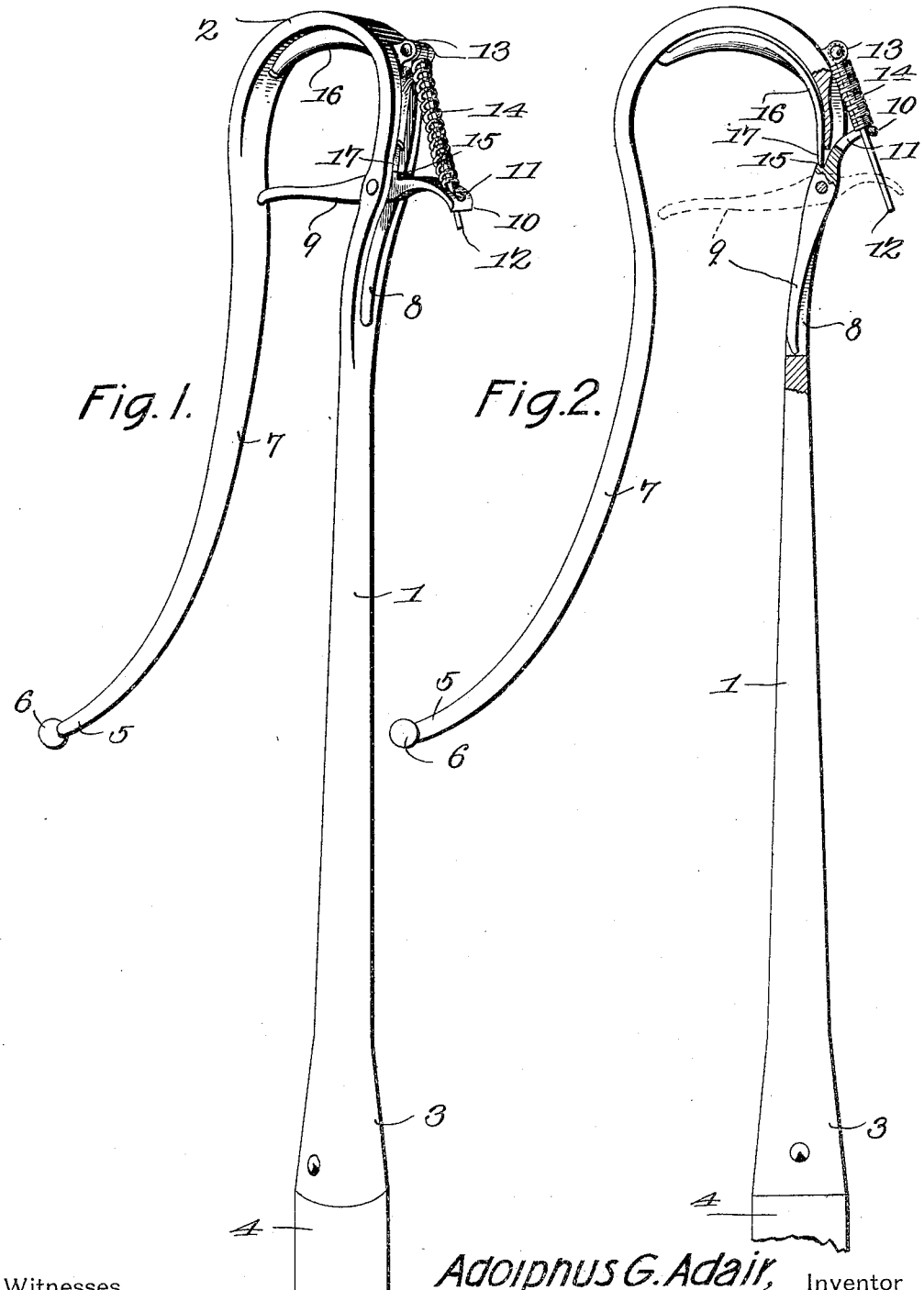

ADOLPHUS G. ADAIR, OF HAVRE, MONTANA.

SHEEP-HOOK.

No. 804,910.　　Specification of Letters Patent.　　Patented Nov. 21, 1905.

Application filed June 1, 1905. Serial No. 263,257.

*To all whom it may concern:*

Be it known that I, ADOLPHUS G. ADAIR, a citizen of the United States, residing at Havre, in the county of Chouteau and State of Montana, have invented a new and useful Sheep-Hook, of which the following is a specification.

This invention relates to that class of devices for catching animals which are generally known as "sheep-hooks;" and it has among its objects to simplify and improve the construction and operation of devices of this character.

With these and other objects in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the advantages of the same.

In said drawings, Figure 1 is a perspective view of a sheep-hook constructed in accordance with the principles of the invention. Fig. 2 is a longitudinal sectional view of the same.

Corresponding parts in both figures are indicated throughout by similar characters of reference.

The body 1 of the improved sheep-hook 2 is preferably made of metal and is formed with an expanded portion 3, preferably socketed for the reception of a wooden staff or handle 4. The point 5 of the hook is made to diverge from the body 1, so as to facilitate the admission of the leg of the animal that is to be caught, and it may terminate in a smooth rounded portion, such as a ball 6.

The shank member 1 of the hook is provided with a slot 8, in which is pivotally mounted a lever 9, having an upwardly and outwardly extended arm 10, which is provided with a slot 11, through which extends the free end of a pin 12, which is pivoted between a pair of lugs 13 upon the outside of the hook. A spring 14, which is coiled upon the pin 12, serves to press downward upon the arm 10 of the lever, the inner end of which is thus normally forced in the direction of the beak 7 of the hook, as shown in full lines in Fig. 1 and in dotted lines in Fig. 2. The slotted arm 10 of the lever is provided near the fulcrum of the latter with a recess or indentation 15.

Permanently secured in the bent portion of the hook is a trigger-spring 16, which is curved nearly in conformity with the bent portion of the hook, from which, however, it is slightly spaced, said spring terminating in a point 17, which is adapted to engage the recess 15 in the lever 9, which latter may thus be secured with the spring 14 under tension in the position shown in full lines in Fig. 2 of the drawings, the body of the trigger-spring being slightly spaced from the bent portion of the hook.

When in operation the limb of an animal is caught with the hook, pressure will be exerted against the trigger-spring 16, the point of which will be released from the indentation 15 in the lever 9, which latter is instantly thrown by the tension of spring 14 to the position shown in Fig. 1 directly across the mouth of the hook, thus preventing the animal from escaping.

This improved device, as will be seen, is of extremely simple construction and efficient in operation. An important feature of the invention is that no latch or locking member is disposed in the path of and required to be displaced by the leg of the animal entering into the hook, the latter being when set for action entirely unobstructed, as will be clearly seen in Fig. 2 of the drawings. It is not until the leg of the animal engages the inner end of the hook that the trigger member is operated to release the latch-lever, with the result of the latter closing upon the leg of the animal and preventing its escape. This device may therefore be used safely and without inflicting injury upon the animals that are caught.

Having thus described the invention, what is claimed is—

1. A sheep-hook having a slotted member, a spring-actuated lever pivoted in said slot and adapted to swing across the mouth of the hook, and a trigger adapted to engage the lever.

2. A sheep-hook, a spring-actuated latch-lever pivotally connected therewith, and trigger means for sustaining said latch in an open position.

3. A sheep-hook, a spring-actuated latch-lever connected therewith and having a recess near its fulcrum, and a resilient trigger member connected with the hook and having a point adapted to engage the recess of the latch-lever.

4. A sheep-hook having a slotted member, a spring-actuated latch-lever pivoted in the slot and having a recess near its fulcrum, and a curved resilient trigger member connected with and approximately coinciding with the inner curve of the hook and terminating in a point adapted to engage the recess of the latch-lever.

5. A sheep-hook having a normally unobstructed mouth, and a spring-actuated closure pivoted in and normally accommodated in a slot in one of the side members of the hook.

6. A sheep-hook, a spring-actuated latch-lever connected therewith and having a slotted outward-extending arm, a pin connected pivotally with the hook and extending through said slotted arm, a spring coiled upon the pin and operating against the lever, and trigger means for setting the latch-lever in non-obstructing position with relation to the mouth of the hook.

7. A sheep-hook, a spring-actuated latch-lever connected therewith and having an outward-extending arm, a spring pressing against said arm and actuating the lever to normally obstruct the mouth of the hook, a curved resilient trigger member connected with the inside of the hook and slightly spaced from the curved portion of the latter, and an engaging portion formed upon the lever to coöperate with the trigger member to retain the latch-lever temporarily against the tension of its operating-spring in non-obstructing position.

In testimony that I claim the foregoing as my own I have hereto affixed my signature in the presence of two witnesses.

ADOLPHUS G. ADAIR.

Witnesses:
EDWIN C. CARRUTH,
ETHEL M. DEWAR.